Sept. 21, 1965

L. HUNTER 3,206,862

VEHICLE WHEEL ALIGNMENT APPARATUS

Original Filed Jan. 8, 1959

INVENTOR:
LEE HUNTER
BY Gravely, Lieder + Woodruff
ATTORNEYS.

Sept. 21, 1965
L. HUNTER
3,206,862
VEHICLE WHEEL ALIGNMENT APPARATUS
Original Filed Jan. 8, 1959
4 Sheets-Sheet 2
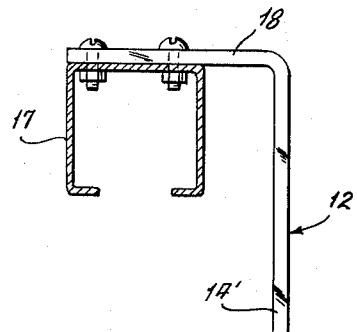
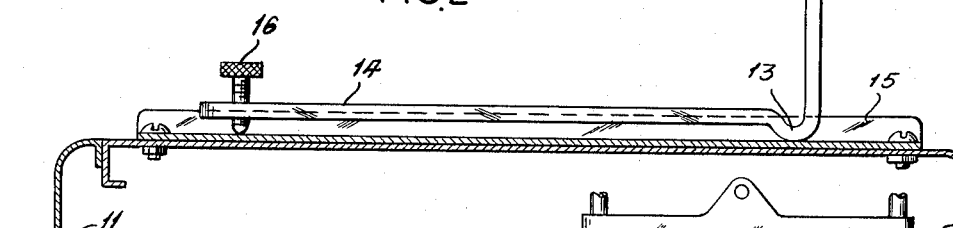
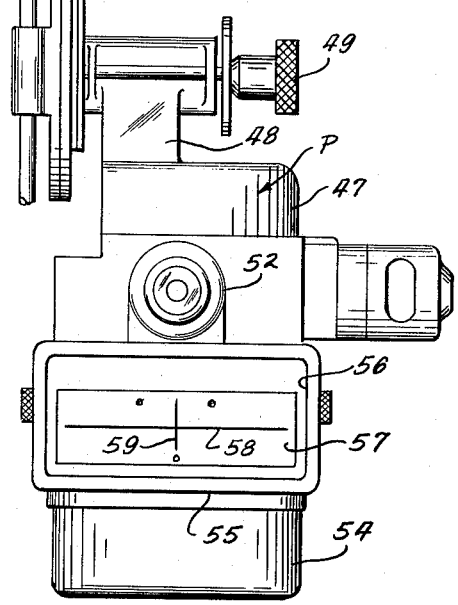
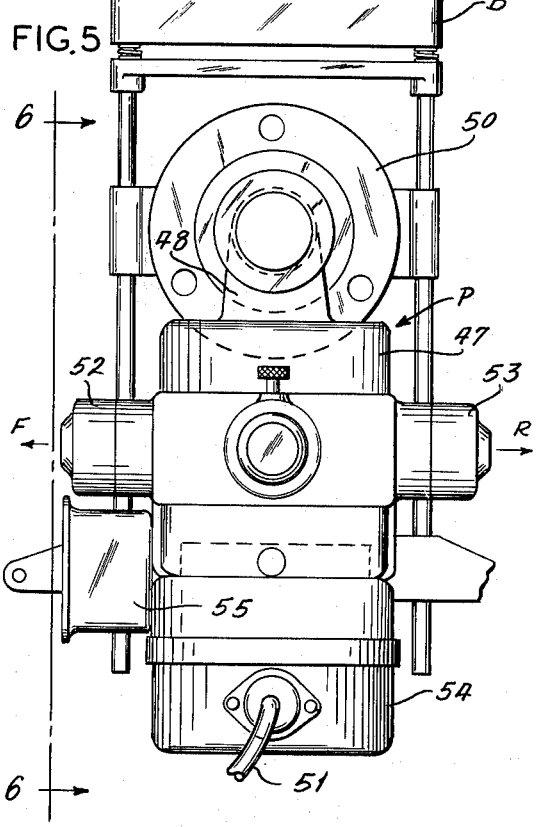
INVENTOR:
LEE HUNTER
BY Gravely, Lieder & Woodruff
ATTORNEYS, Sept. 21, 1965
L. HUNTER
3,206,862
VEHICLE WHEEL ALIGNMENT APPARATUS
Original Filed Jan. 8, 1959
4 Sheets-Sheet 3
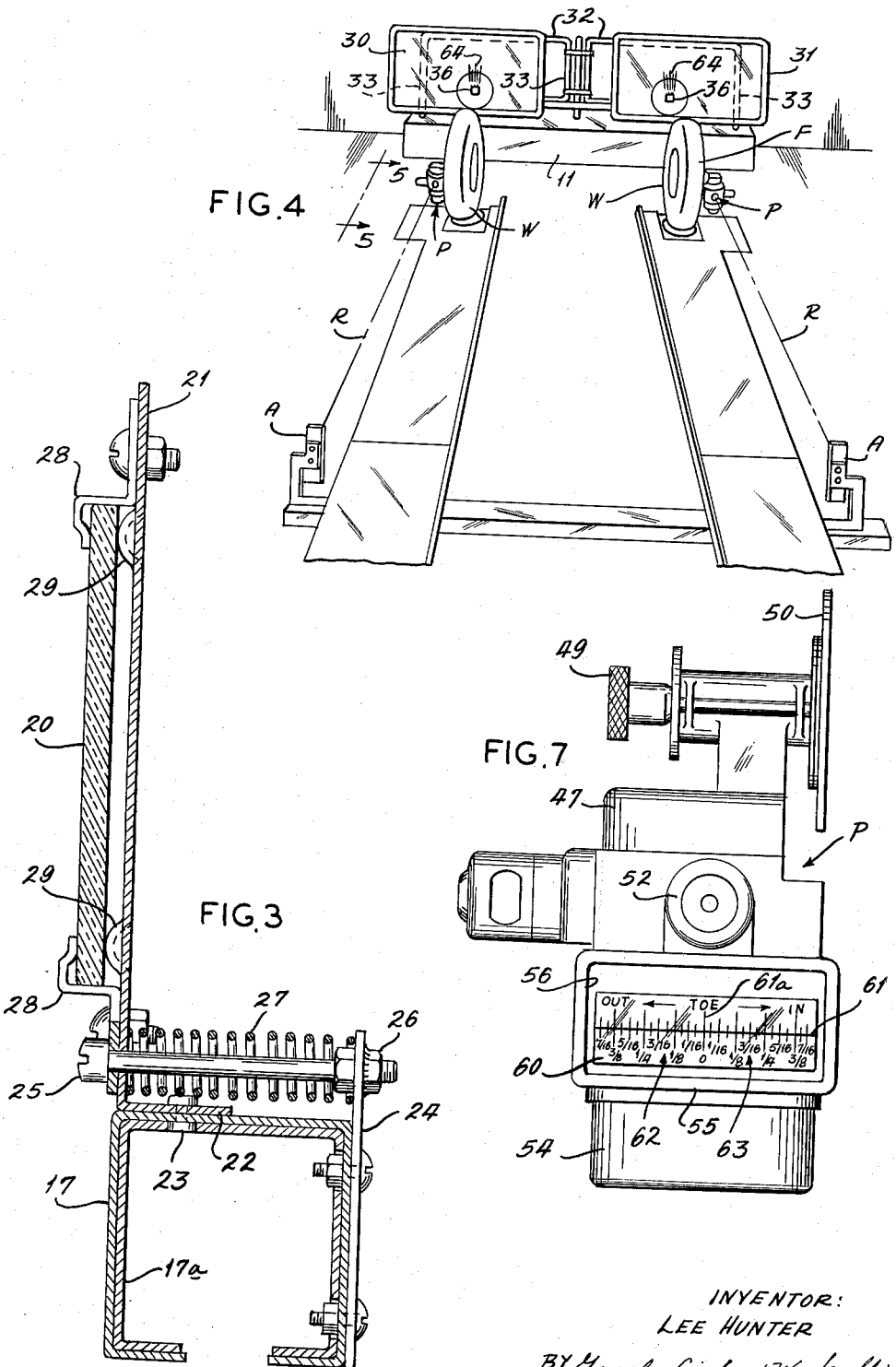
INVENTOR:
LEE HUNTER
BY Gravely, Lieder + Woodruff
ATTORNEYS.

Sept. 21, 1965  L. HUNTER  3,206,862

VEHICLE WHEEL ALIGNMENT APPARATUS

Original Filed Jan. 8, 1959  4 Sheets-Sheet 4

INVENTOR:
LEE HUNTER

BY Gravely, Lieder & Woodruff
ATTORNEYS,

United States Patent Office 3,206,862
Patented Sept. 21, 1965

3,206,862
VEHICLE WHEEL ALIGNMENT APPARATUS
Lee Hunter, Rte. 1, Box 136, Creve Couer, Mo.
Original application Jan. 8, 1959, Ser. No. 785,705. Divided and this application Nov. 20, 1963, Ser. No. 335,705
5 Claims. (Cl. 33—203.18)

This application is a division of U.S. application Serial No. 785,705, filed January 8, 1959, in the name of Lee Hunter for Vehicle Wheel Alignment Apparatus.

This invention relates to improvements in appartaus for determining the conditions existing in vehicle wheel alignment and for aiding the adjustment of wheel alignment characteristics to certain predetermined standards.

A principal object of this invention is to provide apparatus of the light beam type which is adapted to project a light beam responsive to the vehicle wheel upon a chart so that the alignment characteristics of the wheel may be rapidly and accurately checked.

It is also an object of the invention to provide vehicle wheel alignment measuring apparatus in which a light beam projector located at the wheel will cause a light beam to describe the wheel motion upon a chart so that inaccuracies may be determined.

A further object of the invention is to provide alignment apparatus for accurately and rapidly determining the toe-in characteristics of vehicle wheels and for following the toe-in motion during adjustment in a simple and novel manner.

Another object of this invention is to provide a novel combination of charts for light beam type alignment apparatus whereby the toe-in and other wheel alignment characteristics may be accurately determined and continuously followed during adjustment.

A still further object of the invention is found in the provision of alignment chart mounting means and means for effecting service adjustments thereof to maintain the charts accurately conditioned.

Another object of the invention resides in alignment apparatus incorporating a novel system of charts and mirrors for checking wheel alignment characteristics and light beam projecting means and scales cooperating with the charts and mirrors.

A preferred embodiment of this invention comprises a system of light beam projectors and scales at the vehicle wheels together with mounting means therefor, and a system of charts and mirrors adapted to cooperate with the projectors to relay the light beams for the purpose of determining wheel alignment characteristics and for use in making adjustments therein. The invention also comprises means for accurately setting up the apparatus in the first place and for maintaining its accuracy in service. The invention may also comprise sub-assemblies, components, devices and parts of the complete apparatus, some of which are adapted to be mounted on the vehicle and some not so mounted but which cooperate in attaining the stated and other objects.

The apparatus chosen for disclosure herein is illustrated in the accompanying drawings, wherein:

FIG. 2 is an enlarged transverse sectional elevation of the mirror supporting structure taken at line 2—2 in FIG. 1, the structure being typical for both mirrors in the apparatus;

FIG. 3 is an enlarged transverse sectional elevation of the mounting means for each of the mirrors in the apparatus, the view being taken at line 3—3 in FIG. 1;

FIG. 4 is a perspective view of the apparatus similar to the view of FIG. 1, but showing the alignment charts in operating positions in front of the mirrors and including the vehicle wheels in position for alignment, together with the light beam projectors and cooperating components therefor;

FIG. 5 is an elevational view of the left front vehicle wheel showing the light beam projector, the view being taken at line 5—5 in FIG. 4.

FIG. 6 is a front elevational view of the light beam projector attached to the left front wheel of the vehicle, the view being seen at line 6—6 in FIG. 5;

FIG. 7 is a view similar to FIG. 6, but illustrating the scale provided in the light beam projector attached to the right front wheel of the vehicle;

Figure 1:
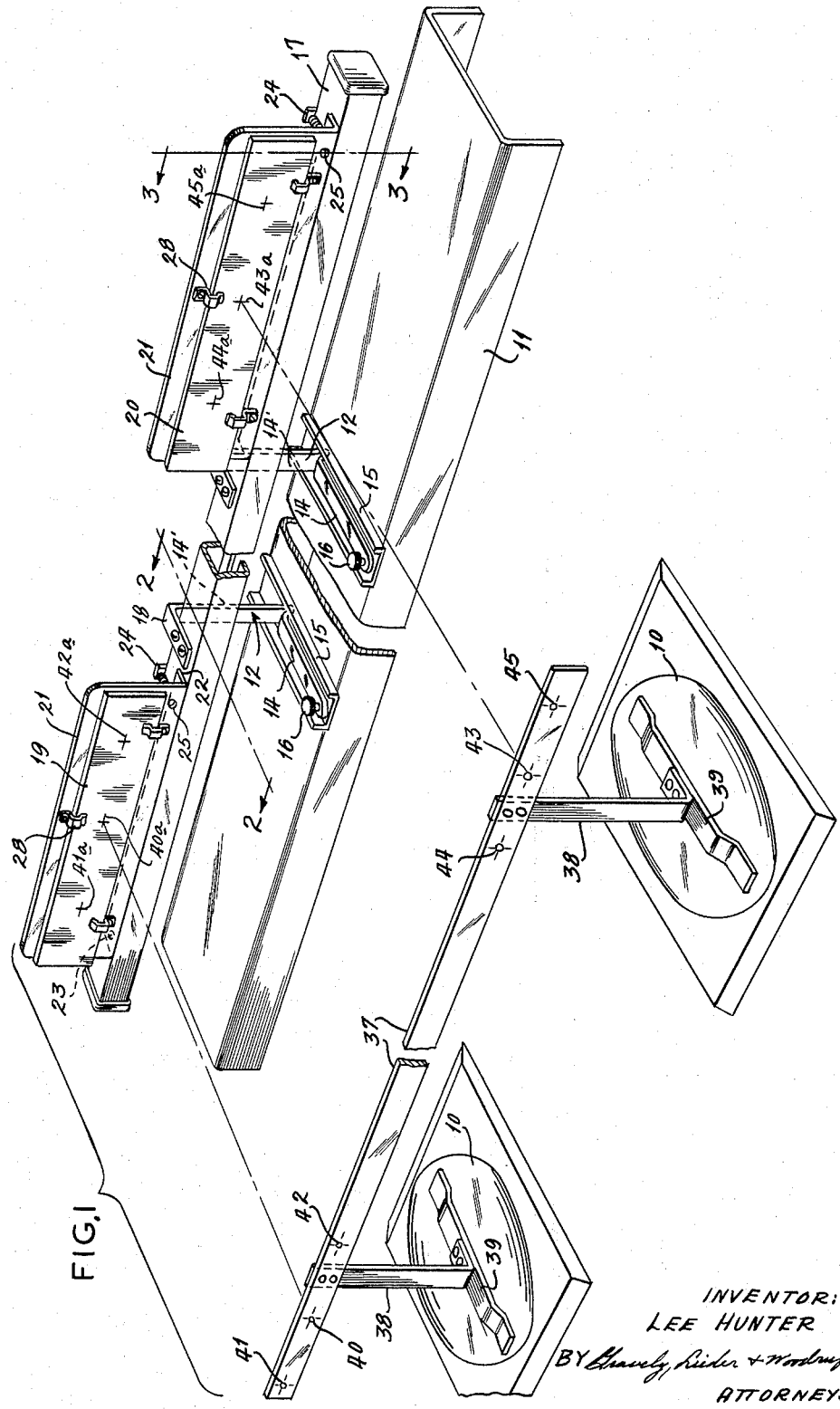
FIG. 1 is a perspective view of the mirror supporting structure and mirror alignment checking device constituting portions of the present apparatus.

The apparatus is best seen with respect to its general construction and layout in FIGS. 1 to 4 wherein a suitable level floor area is chosen for its installation. The layout may be made in connection also with an elevated rack structure for the vehicle which is quite common, or it may be a pit type installation. In whatever layout is chosen the apparatus will incorporate suitable vehicle wheel supporting turn plates 10 located in spaced relation with a base support 11. The base 11 carries a pair of similar support standards or brackets 12 having a rocking bearing or knee 13 and an adjusting leg 14 positioned in a guide channel 15. The guides 15 are sufficiently wide to permit sliding the legs 14 sidewise or in the lengthwise direction of base 11 for a purpose to be later pointed out. Each leg 14 is provided with a tilt adjusting screw 16 by means of which the vertical legs 14' of the brackets 12 may be caused to rock forward or backward on the knee 13 when adjusting the same to raise or lower the upper end 18 thereof. An elongated box-section bar of suitably formed and interconnected telescoping sections 17 and 17a is secured to the upper legs 18 of the respective brackets 12 to support the necessary mirrors and the like which are parts of the apparatus.

As shown in FIG. 1, and in detail in FIGS. 2 and 3, a pair of mirrors 19 and 20 are carried on the bar 17, and a description of the mounting of one such mirror will be given with the understanding that the other mirror is similarly mounted and like reference numerals will apply to each. A mirror bracket 21 (FIG. 3) is formed with a lower flange 22 secured near one end to the bar 17 by a pivot element 23 and adjustably connected near the opposite end to a fixed element 24 through the adjusting screw 25. Screw 25 turns in the bracket 21 and extends through a fixed nut 26 in the element 24, and a suitable spring 27 over the screw abuts with rear surface of bracket 21 and with the fixed element 24 so as to urge bracket 21 against the head of the screw 25. In or out adjustment of screw 25 will compress the spring 27 or permit its expansion to cause movement of the bracket 21 about the pivot element 23 near its opposite end, whereby the mirror 19 on the bracket 21 may be accurately adjusted in a horizontal direction so that the mirrors 19 and 20 can be suitably aligned to be parallel (see FIG. 8). However, one of the adjusting screws 25, say the one associated with mirror 19, may be eliminated and a connecting element 23 substituted so that only mirror 20 need be adjustable. Vertical adjustment of each mirror 19 and 20 relative to or independently of the other is accomplished at the respective legs 14 by means of screws 16 previously described. The bar 17 is made to possess flexibility in torque without impairing its rigidity in bending so that independent or selective adjustment of either screw 16 will introduce sufficient torque reaction to rock the adjacent mirror bracket 21 without affecting the remote mirror bracket.

Mirror 19 is attached (FIG. 3) to its bracket 21 at spaced points by suitable angle clips 28 which clasp the front face of the mirror and hold the same against a dimple or projection 29 formed in the bracket 21. The mirror 20 is similarly attached, and in each instance the clips 28 hold the mirrors without causing distortion thereof such as might stress the mirror face out of a desired true flat plane.

Figure 9:
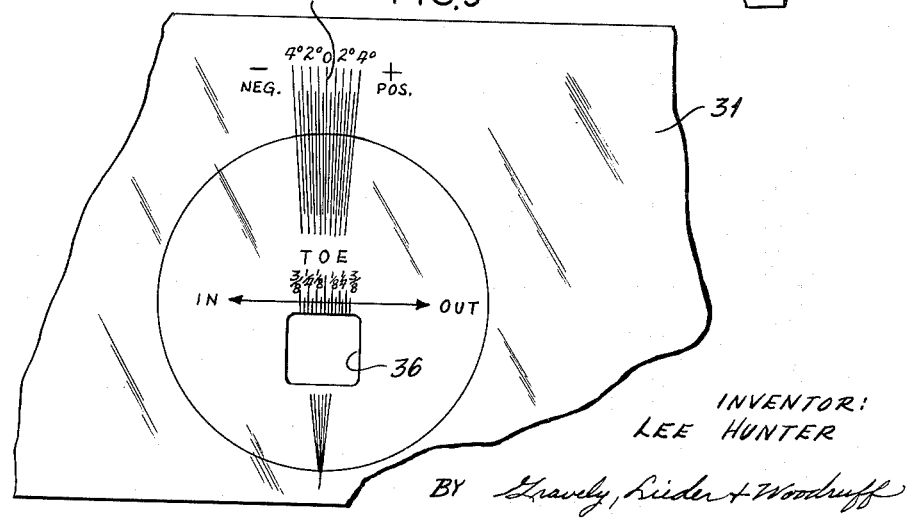
FIG. 9 is a greatly enlarged and fragmentary view of a portion of one chart to show the wheel toe scale which is typical of the showing in FIG. 4.

In FIG. 4 the apparatus is seen to include a pair of chart screens 30 and 31 suitably adjustably suspended from horizontal track means 32, the track being attached to the housing 11 by standards 33. The screens 30 and 31 are positioned in front of the respective mirrors 19 and 20 when in use, but may be removed for adjustment of the mirrors. Each screen is formed (FIG. 9) with an aperture 36 in front of the mirrors so that a light beam can pass through and be reflected back to the beam-projector, as will be later described in connection with the operation of the apparatus for wheel toe-in checking.

Again referring to FIG. 1, the apparatus includes a mirror alignment checking device in the form of an elongated peep hole bar 37. The bar 37 is supported on similar standards 38 at an elevation substantially equal to the elevation of mirrors 19 and 20. Standards 38 have suitable feet 39 to fit upon the wheel turning plates 10. The bar 37 is provided with a series of peep holes 40, 41 and 42 at the left side and a similar series 43, 44 and 45 at the right side. Each peep hole is provided at the back face with cross marks which intersect in the hole center. The left mirror 19 is also provided with three cross marks 40a, 41a and 42a corresponding in spacing with peep holes 40, 41 and 42 in the bar 37, and the right mirror 20 also has cross marks 43a, 44a and 45a matching the spacing of peep holes 43, 44 and 45 in bar 37. Bar 37 is used in the following manner to check the mirrors 19 and 20 to bring them into absolutely parallel relation with each other in a plane longitudinal with the support bar 17.

Bar 37 is first placed adjacent the mirrors 19 and 20 with peep hole 40 directly on top of cross 40a on mirror 19. The mirror 20 is then moved longitudinally by adjusting telescoping bar section 17a relative to section 17 until cross 43a is directly opposite peep hole 43. The other peep holes will automatically line up due to exact center spacing thereof in manufacture. Bar 37 is next placed on the turn plates 10 which are approximately seventy (70) inches from the mirrors 19 and 20, and the distance is measured to be sure bar 37 is exactly parallel with bar 17. A sight is made through peep hole 40 and the mirror 19 will reflect the back face of bar 37 and the cross marks at hole 40. The bar 37 is next moved sideways as needed to exactly line up the cross marks at the back of peep hole 40 with cross marks 40a. Exact alignment in the vertical direction may require turning screw 16 in the bracket leg 14 to rock the bracket 12 for adjusting the mirror 19. A sight is next made at peep hole 43 upon cross mark 43a on mirror 20 to exactly match the cross marks on the back face thereof. Adjustment of the screw 25 in support 21 for mirror 20 may be needed to move mirror 20 horizontally back or forward to secure exact alignment of the cross marks for peep hole 43 and cross mark 43a, and it may also be necessary to adjust screw 16 in arm 14 to vertically adjust the mirror 20 to secure such alignment. Since the bars 17 and 37 are now parallel and the peep holes 40 and 43 are located directly opposite to the cross marks 40a and 43a on mirrors 19 and 20, it is determined that the two mirrors are absolutely parallel with one another at the cross marks thus sighted. To determine if the mirrors are flat and, therefore, in parallel, longitudinal planes along the length of each mirror, sights are made successively through the other peep holes 41, 42, 44 and 45 to see if the corresponding cross marks 41a, 42a, 44a and 45a line up exactly with the corresponding cross marks at the back side of the bar 37 which may be seen reflected in the mirror. Assuming that all cross marks do correctly line up, it is certain that the mirrors are flat to the degree desired. The bar 37 may now be removed and a vehicle placed with the front wheels W upon the turn plates 10, as in FIGS. 4 and 8. It is understood, of course, that the vehicle need not be illustrated in order to simplify the drawing.

The vehicle wheels W are set in a straight ahead position on plates 10, and a light beam projector P of the type shown in FIGS. 5, 6 and 7 is attached to the outer rim of each by means of the mounting bracket device B which will not be described in detail since it forms no part, per se, of this invention.

Turning to FIGS. 5, 6 and 7, each projector P includes a housing 47 having a bearing head 48 to receive a shaft 49 fixed to the mounting plate 50 on the bracket B. The housing 47 is free to swing about shaft 49 and always assume a pendent position as the wheel W is rotated. A light source (not shown) is contained in housing 47 supplied by an electric cord 51 from a suitable electrical outlet. The light beams in the form of horizontal and vertical coordinate cross lines are projected from the housing 47 by means of suitable lens units 52 and 53, lens unit 52 projecting beam F and lens unit 53 projecting beam R. A suitable cooling fan is contained in the base 54 of the projector to circulate air and carry the heat therefrom, as is common. A box-like light beam receiving device 55 is secured to the housing 47 adjacent lens unit 52 and the box opening 56 faces the screens 30 and 31. The projector P shown in FIGS. 5 and 6 is attached to the left-hand wheel W in FIG. 4, and a similar projector P is attached to the right-hand wheel W in FIG. 4. Each projector is the same except for the scale contained in the box 55. The left-hand projector P (FIG. 6) has a simple zero index scale 57 in the device 55 arranged with a horizontal coordinate line 58 and a vertical coordinate cross line 59. On the other hand, the right-hand projector P has a toe scale 60 (FIG. 7) in the device 55, such scale being suitably scribed with a vertical coordinate zero line 61 and toe-out and toe-in horizontal coordinate line having portions for measurement scales 62 and 63, respectively, on which fractional indicia are indicated.

The projectors P are turned on to throw light beams F forward at screens 30 and 31, and light beams R rearward along side the vehicle. The straight ahead position of wheels W is determined with the projectors P lighted by turning the wheels upon the turn plates 10 until the beams R intersect suitable marks on targets A. The targets A are positioned approximately seventy (70) inches back of the projectors P and are equal distances out from the longitudinal center line of the vehicle frame (not shown). Any convenient scale or measuring stick (not shown) may be used to locate targets A outward from the frame so that the light beams R show up on the stick to indicate when equal distances are obtained. It may be necessary to slightly turn the wheels W to achieve the desired result.

Figure 8:
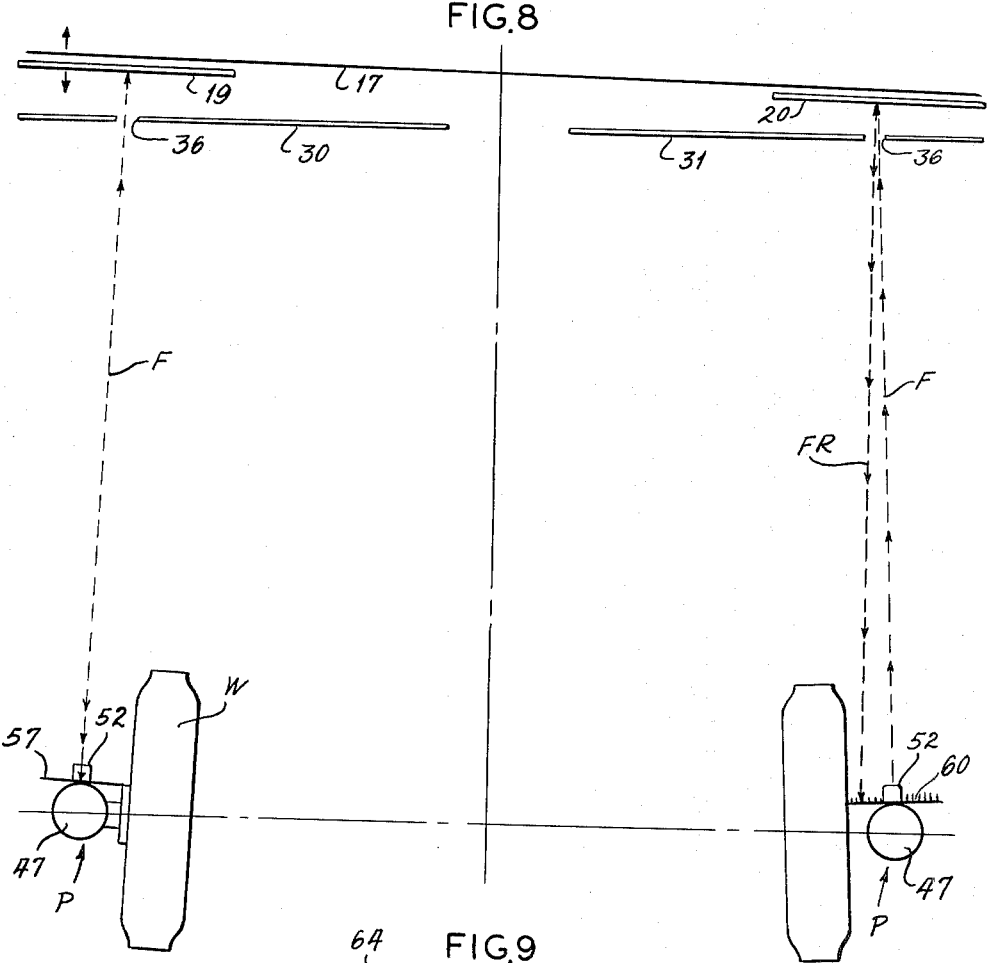
FIG. 8 is a schematic plan view of the apparatus shown in FIG. 4 to illustrate the method of operation thereof for alignment of the front wheel toe-in characteristics of a vehicle.

In FIG. 8 there is illustrated schematically a plan view of the apparatus in use for determining toe-in or toe-out characteristics of wheels W. The method of operation, once the wheels have been set in a straight ahead attitude as above described in connection with FIG. 4, requires the mechanic to slide the left-hand end of mirror supporting bar 17 forward or backward (toward or away from the vehicle) by moving leg 14 in the guide 15 in order to adjust the left mirror 19 to reflect the vertical line of beam F directly back upon the vertical zero index line 59 on scale 57 in the device 55. Next the adjusting screw 16 for the left mirror 19 is turned until the horizontal line of the same beam F lies upon the horizontal scale line 58. The forward or backward sliding of the bar 17 also adjusts right mirror 20 by an amount which will cause the forward light beam F to be reflected back along the beam line FR which deviates from the beam F by a small angle. The reflected light beam FR from mirror 20 strikes the toe scale 60. It may be necessary to adjust the screw 16 of the right-hand leg 14 to get the horizontal light beam line to fall upon the horizontal line of the toe scale indicia. The vertical beam line of the beam FR will now fall upon the toe-in scale portion 63 or toe-out scale portion 62, depending upon the actual conditions. The amount of toe may be read directly on the chart 60 since the left wheel beam F has been set to its zero setting on chart 57.

The apparatus described is very useful when making necessary adjustments on the vehicle tie-rods to overcome incorrect toe of the wheels. It is necessary for the mechanic to be under the vehicle when adjusting the tie-rods, so the direct reading toe scale 60 at the right-hand projector P cannot be observed. This situation is overcome by adjusting the chart screens 30 and 31. The screen 30 is moved on the support track 32 until the vertical zero line 64 on the toe chart adjacent aperture 36 registers with the vertical line of the left-hand light beam F. Screen 31 is also moved on track 32 to bring the vertical light line of the right-hand light beam F into register with the same fractional reading line (toe-in or toe-out) on the toe chart carried by the screen 31 as was obtained directly upon the right-hand projector scale 60. The mechanic may now make the tie-rod adjustments and can note the results thereof by observing the light line projected upon the right-hand screen 31 while remaining under the vehicle.

The preferred form of the invention described herein is capable of change and variations in its several parts without altering the principle of its operation or the method of application as set forth herein and defined by the annexed claims. For example, the scale or chart in the left-hand receiver device 55 may be similar to the scale or chart 60 in the right-hand receiver device 55 so that the wheel toe characteristics may be obtained at either wheel. In the latter case it may be useful, if the toe characteristics are badly off the desired standard, to adjust each wheel W in order to preserve the center steering geometry. It is also a feature of the described apparatus to be able to follow the wheel adjustments visually from beneath the vehicle by following the steps in the method of setting the apparatus into use with the aid of the charts 30 and 31. It is, of course, understood that the light beams projected by the projectors P may have crossed filaments which are aligned to assume vertical and horizontal positions, and the filaments may be elongated to extend over width and height distances greater than those of chart openings 36.

What is claimed is:

1. Apparatus to determine toe alignment of a pair of steerable vehicle wheels including a light projector for each wheel, mounting means connecting each said projector to a wheel to direct the light beam in a straight ahead direction, a light beam receiving scale device carried by each light projector, a first one of said devices having a zero index and the second device having a zero coordinate and toe-in and toe-out scales arranged to either side of said zero coordinate, a light beam reflecting mirror element disposed in spaced relation ahead of each projector mounted on each vehicle wheel, common support means for said mirror elements, and slide means receiving said common support means, said common support means being angularly movable in said slide means for simultaneously positioning said mirror elements to reflect the light beam from said first one of said projectors directly back to said zero index in one of said scale devices, the other light beam being reflected back to the second one of said scale devices to fall selectively upon said toe-in and toe-out scales, thereby indicating the toe alignment of the wheels.

2. The apparatus set forth in claim 1 wherein said light projector mounting means includes horizontal bearing means supporting the projector in pendent position to have the light beam directed substantially horizontally, said first one of said scale devices having a horizontal coordinate intersecting the zero index, and said second one of said scale devices also having a horizontal coordinate intersecting the zero coordinate, said toe-in and toe-out scales being arranged along said last horizontal coordinate.

3. The apparatus set forth in claim 2 wherein said common support means for said mirror elements includes adjustment means for tilting the same to adjust said mirror elements to positions reflecting the light means upon said horizontal coordinates at each said scale devices carried by said light projectors.

4. The apparatus set forth in claim 2 wherein said light projector associated with said second scale device is adapted to form a horizontal and vertical cross line light beam, the horizontal light beam line cooperating with said horizontal coordinate and the vertical light beam line cooperating with said zero index.

5. The apparatus set forth in claim 1 wherein said common support means for said mirror elements is provided with track means, screen means are horizontally slidably mounted on said track means, a screen being adjacent each mirror element, each screen having an aperture therein to align with its associated adjacent mirror element, and each screen having toe alignment indicia thereon at the aperture therein for light beam observation from under the vehicle while adjusting toe alignment.

References Cited by the Examiner

UNITED STATES PATENTS

| | | | |
|---|---|---|---|
| 2,292,968 | 8/42 | Peters | 33—203.18 |
| 2,292,969 | 8/42 | Peters | 33—46.2 |
| 2,470,090 | 5/49 | Carrigan et al. | 33—46.2 X |

FOREIGN PATENTS 815,652  7/59  Great Britain.

ISAAC LISANN, *Primary Examiner.*